United States Patent [19]
Van Gennep

[11] Patent Number: 5,690,416
[45] Date of Patent: *Nov. 25, 1997

[54] HOLDER ADJUSTABLE TO HOLD A FLASHLIGHT SELECTED FROM A GROUP OF DIFFERENTLY SIZED FLASHLIGHTS

[76] Inventor: Jan Van Gennep, 715 Laural Ave., Menlo Park, Calif. 94025

[*] Notice: The term of this patent shall not extend beyond the expiration date of Pat. No. 5,573,329.

[21] Appl. No.: 585,377

[22] Filed: Jan. 11, 1996

[51] Int. Cl.⁶ .................................................. F21L 7/00
[52] U.S. Cl. ........................ 362/191; 362/389; 362/396; 248/231.5
[58] Field of Search ........................ 362/191, 396, 362/389, 72; 248/231.5

[56] References Cited

U.S. PATENT DOCUMENTS

| | | | |
|---|---|---|---|
| 1,141,152 | 6/1915 | Stahl | 362/396 |
| 1,562,994 | 11/1925 | Stewart | 362/396 |
| 1,684,347 | 9/1928 | Dobbs | 248/229 |
| 1,807,501 | 5/1931 | Alexander | 248/229 |
| 1,865,127 | 6/1932 | McKeen | 362/191 |
| 2,287,485 | 6/1942 | Pierce | 248/231.5 |
| 3,111,296 | 11/1963 | Ludes | 248/231.5 |
| 4,333,132 | 6/1982 | Paley | 362/389 |
| 4,541,312 | 9/1985 | Petersen | 81/367 |
| 4,980,805 | 12/1990 | Maglica | 362/72 |
| 5,203,797 | 4/1993 | Petersen | 81/367 |
| 5,303,133 | 4/1994 | Wagner | 362/191 |
| 5,515,246 | 5/1996 | Maglica | 362/72 |
| 5,573,329 | 11/1996 | Van Gennep | 362/191 |

Primary Examiner—Ira S. Lazarus
Assistant Examiner—Matthew Spark
Attorney, Agent, or Firm—Julian Caplan; Flehr Hohbach Test; Albritton & Herbert LLP

[57] ABSTRACT

A flashlight holder is described which can be used with differently sized flashlights. The holder includes vise grip pliers for gripping structure adjacent a location it is desired to illuminate. A connector of the holder includes a collar for one size flashlight, as well as two rings for flashlights of other sizes. A bolt is threaded within the collar and acts as an adjustment mechanism for connection to any one of the differently sized flashlights. An interface device which secures the connector to the vise grip pliers facilitates the holding of flashlights or other objects of different weights. Its construction includes a mating ball and socket structure cap and a housing for a bolt on another adjustment mechanism provided as part of the vise grip pliers. The housing and cap are so secured together by bolts that tightening or loosening them changes the resistance to movement of the ball within the socket and movement of the interface device relative to the vise grip pliers.

10 Claims, 3 Drawing Sheets

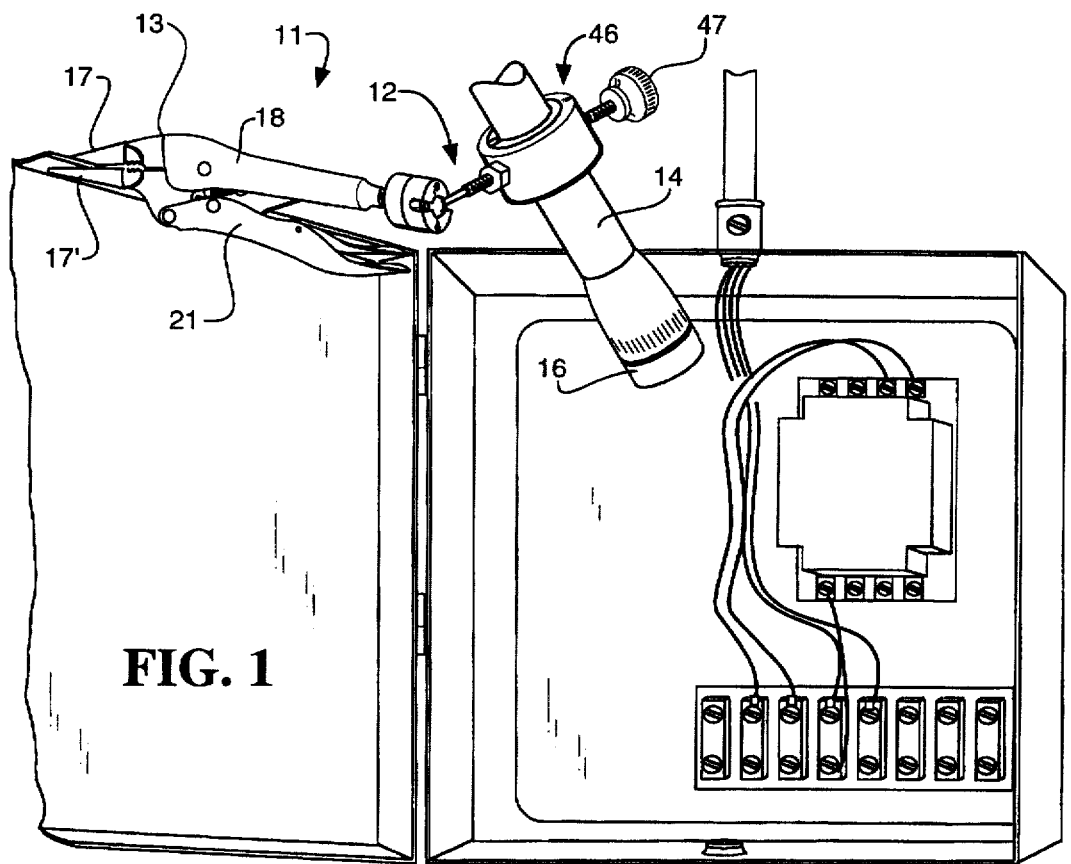
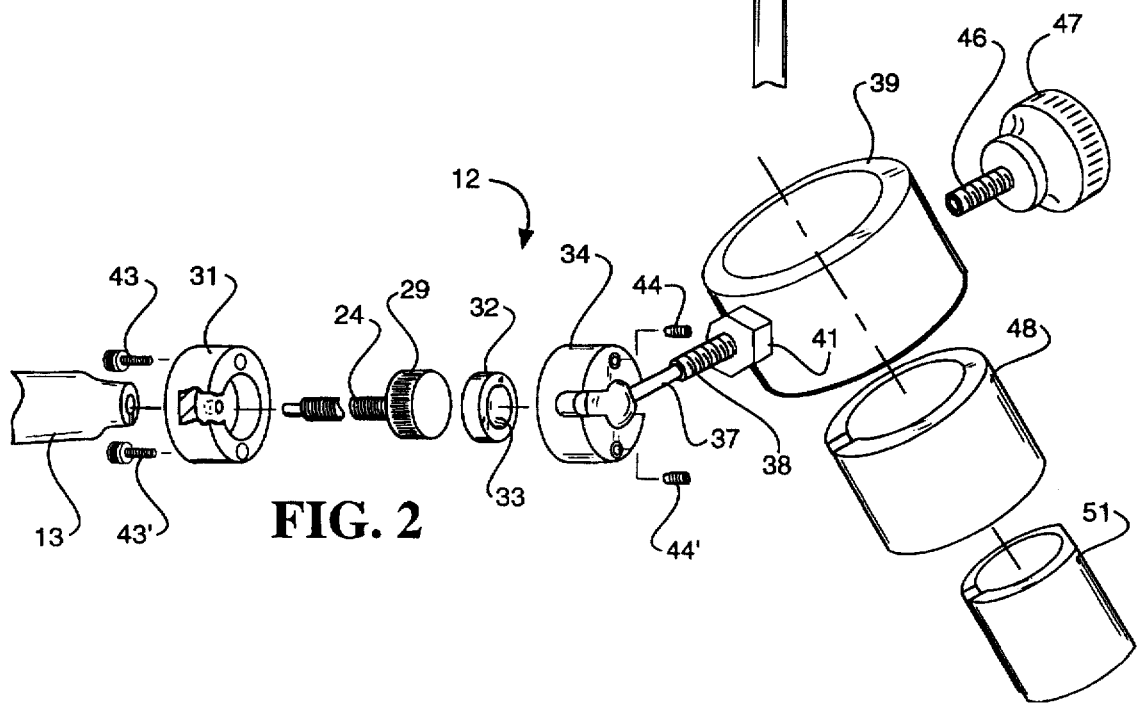
FIG. 1
FIG. 2

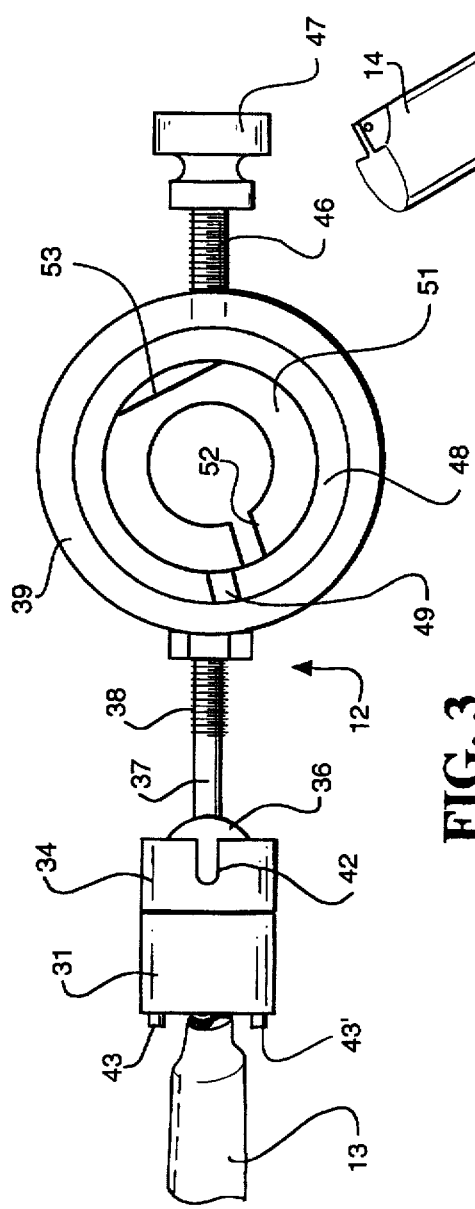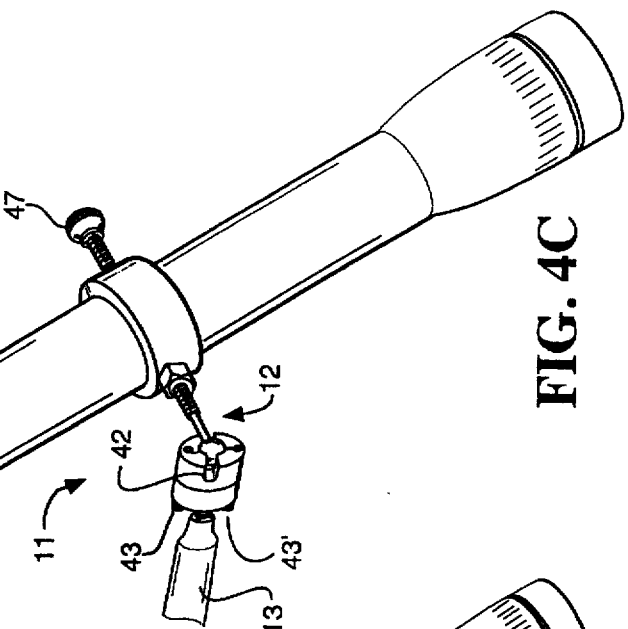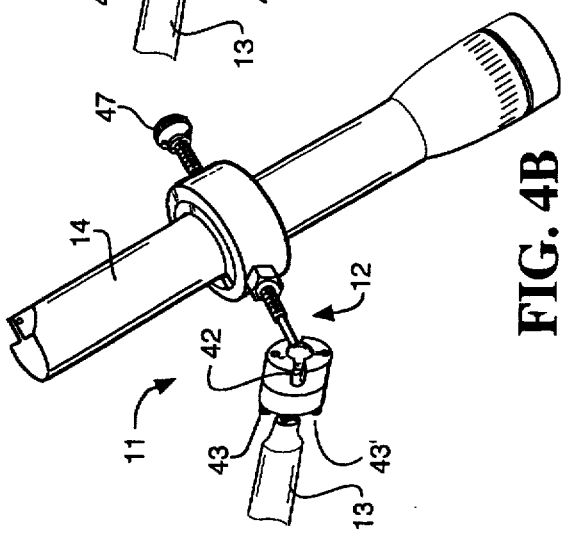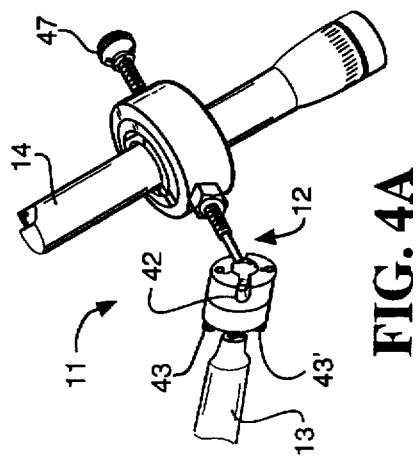

HOLDER ADJUSTABLE TO HOLD A FLASHLIGHT SELECTED FROM A GROUP OF DIFFERENTLY SIZED FLASHLIGHTS

BACKGROUND OF THE INVENTION

The present invention relates to an adapter capable of holding an instrumentality at a desired location, such as a flashlight selected from a group of differently sized flashlights.

There is a type of flashlight whose focusing can be changed to enable the same to illuminate a particular spot irrespective of the location (within reasonable limits) of the flashlight itself. Examples of this type of flashlight are those made by Mag Instruments, Inc. of Ontario, Calif. and distributed with the trademark MAG-LITE. There are different sizes of such flashlights, i.e., different models made to operate with differently sized batteries. Such flashlights are now widely used by carpenters, mechanics, and others involved in such things as building or remodeling houses, automotive engines, etc. The selection of which flashlight size to use depends on the desired illumination and its time.

One problem with use of this type of flashlight is that it is necessary to hold the same at a location from which light can be focused to the area or spot desired to be illuminated. If the flashlight is held by a human with one of his/her hands, the hand most often will not also be usable to help conduct an operation at the position illuminated. Because of such, some have even stooped to holding flashlights with their teeth in order to free a hand so that both can be used for the operation. (Pliable caps or collars are even sold allegedly to facilitate holding of a flashlight by a worker in his/her teeth.)

Patent application Ser. No. 08/361,594 filed Dec. 22, 1994 is directed to an adapter designed for a flashlight of this nature, as well as other instrumentalities. This application issued Nov. 12, 1996 as U.S. Pat. No. 5,573,329. The present invention relates to improvements to such adapter.

SUMMARY OF THE INVENTION

The interface unit provided as part of the adapter is a major feature of the invention. Even though it is simplified relative to that of the holder of the earlier patent application, its configuration is such that it cooperates with both a gripping device and an orientation change mechanism to provide the resistance to orientation change needed by many instrumentalities because of their weight. In this connection, the interface unit is usable with instrumentalities other than flashlights.

The interface unit of the invention includes a housing for encompassing a projection provided by the gripping device—specifically the housing encompasses the head of an adjustment bolt. The head is rotatable within such housing and, as will become clear hereinafter, the resistance to rotation of the head within the housing is variable together with the resistance to orientation change provided by the orientation change mechanism. (Most simply, a ball and socket arrangement.)

The remainder of the interface unit is so related to the gripping device and the adjustment mechanism that the adapter does not interfere with adjustment of the gripping device. Moreover, the structure defining the socket of the preferred orientation change mechanism is relieved to accommodate structure secured to the ball.

Other features and advantages of the invention either will become apparent or will be described in connection with the following, more detailed description of preferred embodiments of the invention.

BRIEF DESCRIPTION OF THE DRAWING

With reference to the accompanying drawing:

FIG. 1 is an isometric view illustrating a preferred embodiment of the invention maintaining a flashlight in position for illuminating a desired location;

FIG. 2 is an exploded partial isometric view showing an adapter of the embodiment of FIG. 1 and the manner in which it is securable to the head of the adjustment bolt of a pair of vise grip pliers;

FIG. 3 is a plan view of the adapter of the preferred embodiment;

FIGS. 4A, 4B and 4C are respectively isometric views showing interaction of the adapter with three differently sized flashlights.

DETAILED DESCRIPTION OF THE PREFERRED EMBODIMENTS

Figure 5:
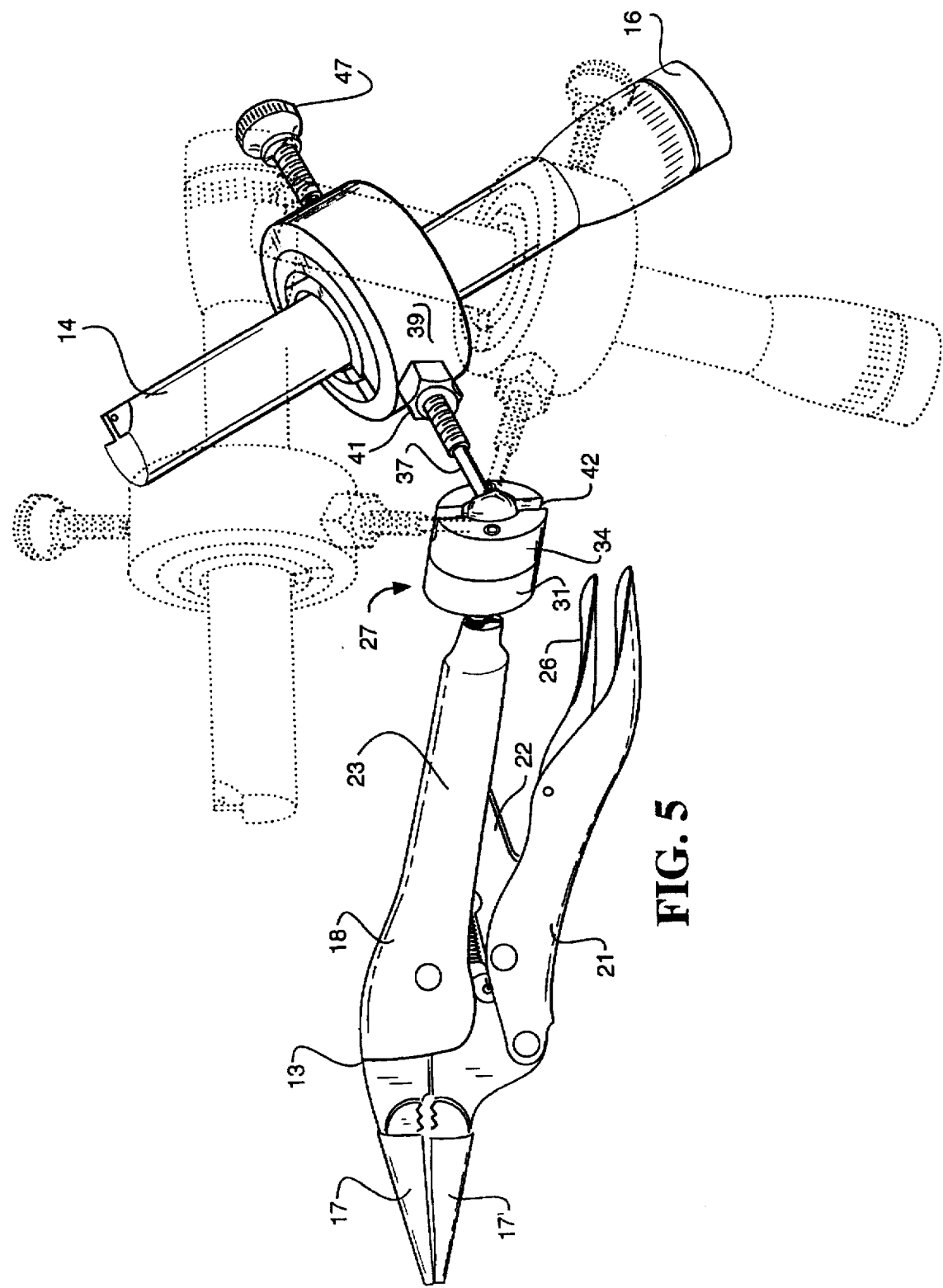
FIG. 5 is an enlarged side isometric view of the preferred embodiment of FIG. 1, showing in phantom alternate positions of a connector.

The following relatively detailed description is provided to satisfy the patent statutes. It will be appreciated by those skilled in the art, though, that various changes and modifications can be made without departing from the invention.

A preferred embodiment of a holder of the invention is generally referred to in the figures by the reference numeral 11. Such holder includes an adapter 12 to be described in more detail hereinafter, and a gripping device in the form in this embodiment of standard vise grip pliers 13. The adapter 12 is secured as indicated to a flashlight 14. Such light includes an output end 16 from which a beam of illumination can shine to a location of an operation to be performed. As will be discussed in more detail below, the flashlight 14 is a selected one of a plurality of differently sized flashlights with which the holder of the invention can be used.

Vise grip pliers 13 are conventional and include a pair of opposing jaws 17 and 17' and a handle 18. (Such jaws may be covered as is illustrated.) As is common, the handle 18 includes a manipulatable hand trigger 21 which is suitably connected to lock the jaws 17 and 17' with an over-center operation in a desired set position relative to one another.

The distance between the jaws 17 at which manipulation of handle trigger portion 21 provides locking, can be adjusted in a standard way. In this connection, a lever 22 pivotally connected to trigger 21 extends into the "stationary" handle portion 23. The end of the lever 22 within handle portion 23 bears against the end of the shank of a bolt 24 threaded into the handle portion. In accordance with common arrangements of this nature, the location of the end of the bolt shank in the handle and, hence, the end of the lever 22, determines the positioning of the jaws 17 and 17' relative to one another when the vise grip pliers are placed in a locked (handle 21 is placed in an over-center position) and set position.

It will be seen from the above that it is rotation of the bolt which changes the location at which the vise grip plier jaws become set. The bolt 24 and its manner of connection to the vise grip pliers provides an adjustment mechanism for changing such set position. A release hand lever 26 is pivotally secured to the handle portion 21 in accordance with conventional practice to be depressed toward the handle portion 21 and engage the lever 22 with a lever action to aid in breaking an over-center lock.

The adapter is designed so as not to interfere with use of the adjustment mechanism. To this end, such adapter includes an interface unit 27 secured to the bolt 24. The bolt 24 projects from the remainder of the adjustment mechanism and is the only point of connection between the pliers 13 and the adapter. Threading movement of the bolt shank 24 within the vise grip plier handle portion 23 is not obstructed.

The head 29 of the bolt 24 fits within a base housing 31 of the interface unit 27. While the base housing 31 generally fits relatively tightly on the head 29, provision is made for rotation between the two as discussed below. Since most vise grip adjusting screws are made of a hard material, such as of hardened tool steel, it is preferred that the base ring be a case hardened such as, for example, Leadloy No. 12L14. The frictional resistance to rotation thereby can be increased without concern that the bolt head will simply "tear up" the interior of the base housing.

The adapter of the invention includes structure defining an orientation change mechanism that enables the orientation of any flashlight or other instrumentalities held by such adapter to be changed. In this connection, it includes a mating ball and socket structure. A disk-shaped insert 32 (FIG. 2) mates with the bolt head 29 and fits within a cap 34. As illustrated, the surface of the same facing away from the bolt head has a spherically concave recess 33, and cooperates with cap 34 to define a spherical socket within which a ball 36 resides. As illustrated, ball 36 has a rod 37 extending from the same, which rod is threaded at its other end as represented at 38. It is threadably received within a collar 39 to be discussed in more detail below, and a tightener nut 41 is provided so that a tight connection between the pin and collar can be assured.

A groove 42 in the cap 34 extends across the ball socket to accommodate the rod 37 during rotation of the ball. The axis of such groove passes through the rotational center of the ball to enable a full 90° rotation of the rod relative to the axis of the shank of the bolt. Such groove in essence relieves the structure defining the ball socket to accommodate the rod as required to enable such 90° movement. It will also be seen that this 90° orientation change can be made over a full 360°. That is, the base housing 31 is rotatable relative to the bolt head 29 and, hence, relative to the vise grip pliers as discussed above. Thus, one can position the groove 42 at any location in such 360°.

The base housing 31 at the other end of the adapter is secured via fasteners in the form of a pair of small Phillips bolts 43 and 43' to the cap 34. As mentioned previously, the interface unit of the invention is constructed to accommodate differently sized flashlights. It will be seen that the amount of frictional force between the head and base housing 31, and between the cap 34 and ball 36 can be changed. This change in friction between these parts and, hence, the resistance to rotation provided by the same is an important part of making the adapter able to accommodate differently sized flashlights, i.e., different weights of instrumentalities. Thus, the bolts 43 and 43' or, in other words, the resistance varying means sandwiches the housing and the cap together, and tightening or loosening such bolts varies both of these frictional resistances simultaneously. This ability to provide adjustment of the two frictional resistances associated with orientation change simplifies the design. A pair of set screws 44 and 44', respectively, are provided within the threaded holes for the bolts 43 and 43' to abut against the same and hinder unintentional loosening of the latter.

It is the cooperation of several elements in the preferred embodiment responsible for it being able to accommodate differently sized flashlights. One of such elements is the collar 39. As is illustrated, an adjustment mechanism in the form of a threaded bolt 46 having a knurled knob 47 as a head extends through the collar 39 (see FIG. 3) in threadable engagement therewith. The collar has an internal dimension which is slightly greater than that of the casing of a flashlight to be held by the same. The user then easily can secure a flashlight within the holder simply by inserting the flashlight casing within the collar and then rotating the bolt 46 with the knurled head 47. The end of the bolt shank will bear against such flashlight casing. Most desirably, the configuration of the interior surface of the collar also corresponds to the casing of the flashlight. When both are cylindrical (a common flashlight configuration) the securance is simplified. FIG. 4C shows the same with the collar holding a flashlight sized to receive "D" size batteries.

The connector of the invention also includes a ring 48 which provides several functions. Such ring has an external configuration and dimension to fit within the collar as is illustrated. Such ring also has an internal dimension (ID) which is slightly greater than that of a casing of a differently sized flashlight, and its configuration complements that of the flashlight casing with which it is to interact. Moreover, such ring is split, i.e., a slot 49 is provided in the same completely disconnecting the opposed legs of such ring. Thus, when the ring is installed within the collar as is illustrated and the bolt 46 tightened to bring its shank end against such ring, such ring will constrict and its internal diameter will likewise be reduced in size. In this connection, ring 48 preferably is made from a plastic which will facilitate such restriction without breaking.

It will be seen from the above that with ring 48 the adapter of the invention is also usable to hold a differently sized flashlight. This is illustrated in FIG. 4B in which the adapter is shown holding a cylindrical casing of a flashlight sized to receive "C" size batteries. In this connection, the interior surface of the ring also is preferably cylindrical. To the extent described so far, the bolt 46 has two functions. The end of its shank directly engages a larger flashlight to secure the same within the collar and such shank end engages an installed outer ring to restrict its size.

The adapter of the invention is usable to provide rigid securance of a flashlight of a third size. That is, it also includes an inner ring 51 which fits as illustrated in FIG. 3 within ring 48. Such inner ring also includes a slot 52 similar to the slot 49 to separate opposed legs. Moreover, it is made from a plastic which will react to pressure on the exterior of the ring by constricting its ID. A chord relief 53 is provided opposite the slot 52 to facilitate such constriction.

The internal dimension of ring 51 is slightly greater than the casing of a flashlight to be held thereby and the configuration of its internal surface complements that of such casing. It will be seen that restriction of the size of the outer ring 48 by manipulation of the bolt 46 also can be used to restrict the internal diameter of the inner ring 51. FIG. 4A illustrates the use of the adapter to hold a flashlight having a casing designed to accommodate "AA" batteries.

It is to be noted that the interaction of the bolt with the single collar causes gripping of the casings of three differently sized flashlights. An operator therefore can use the same adjustment mechanism for any selected one of three differently sized flashlights. It is only necessary that a single operator keep track of the rings if such operator wants to be in a position to utilize the adapter of the invention with differently sized flashlights.

FIG. 5 illustrates orientation change adjustments. Two alternate positions for the adapter and flashlight are illustrated, although it will be recognized that any position within a full hemisphere can be achieved. In this connection, as mentioned previously, the relief in the socket provided by the groove 42 will accommodate the rod 37 to permit a full 90° orientation change of the rod 37 relative to the axis of the bolt 24. This orientation change can be made over a full 360°. The sleeve 31 is rotatable relative to the vise grip pliers so as to enable one to position the groove 42 at any location in such 360°. It should be noted that although the groove is shown extending fully across the cap 34, i.e., it extends from the socket to opposed sides of the cap, it is only necessary from the broad standpoint that it extend between the socket and one side of the cap.

It will be seen by the above that in this embodiment two rotations which are frictionally resisted to provide the hemispherical adjustment. It is provided by rotation of the base housing 31 relative to the bolt head 29 and by rotation of the ball 36 within the socket provided by the cap 34. The resistance to these rotations are simultaneously varied with the bolts 43. That is, these two bolts sandwich the base housing and cap together and because the insert 32 is placed to transmit force from the cap 34 to the bolt head, rotation of the small bolts 43 will adjust both resistances simultaneously. The ability to adjust such resistances enables differing weights to be accommodated by the adapter, and the ability to vary them together simplifies both the construction of the unit and operation.

It is particularly advantageous to use a vise grip pliers type of gripping device. Besides vise grip pliers taking up a minimum of space, the jaws of the same are connectable to many different structural configurations. These include configurations that may not be grippable by other devices, i.e., those having minimum grippable surface areas. The use of a gripping device as represented by vise grip pliers 13 as opposed to a spring clamp is also important for use of the invention to hold heavier flashlights instrumentalities.

The embodiments of the invention described in this application have many improvements relative to the embodiments described in the earlier previously mentioned application. For one, the number of parts is less even though the capabilities are increased. However, as mentioned at the beginning of the detailed description, applicant is not limited to the specific embodiments described above. They are exemplary, rather than exhaustive. Various changes and modifications can be made. The claims, their equivalents and their equivalent language define the scope of protection.

What is claimed is:

1. An interface unit for securing a connector for an instrumentality to a gripping device of the type providing a parality of locked, set positions for locking to differing structures, comprising:
   A. A first housing portion for encompassing a projection for said gripping device;
   B. An orientation change mechanism for said instrumentality secured rigidly to said housing to facilitate changing the orientation relative to said gripping device of an instrumentality held by said connector, said mechanism comprising a second housing portion, and
   C. A fastener for varying the resistance to orientation change provided by said orientation change mechanism, said fastener connecting said first and second housing portions together.

2. The interface unit of claim 1 further including an adjustment mechanism for changing the locked set position provided by said gripping device, and said housing is connected to said gripping device only at said projection.

3. In combination the interface unit of claim 1 and a projection of said gripping device, which gripping device includes structure securely attached to said projection which, in turn, is encompassed by said housing.

4. The interface unit of claim 1 wherein said orientation change mechanism for said instrumentality includes a mating ball and socket structure.

5. The interface unit of claim 4 wherein the structure defining said socket is relieved at said socket to accommodate structure secured to said ball.

6. The interface unit of claim 1 wherein rotation of said housing relative to said gripping device is controlled by friction therebetween, and said fastener is rotatable to vary the resistance to rotation of said housing relative to said gripping device.

7. The interface unit of claim 6 wherein said orientation change mechanism includes a mating ball and socket structure to vary simultaneously the frictional resistance to rotation of said housing relative to said projection and the frictional resistance of rotation of said ball.

8. The interface unit of claim 7 wherein said projection is the head of a bolt, which head fits within said housing.

9. In combination the interface unit of claim 1 wherein said interface unit has structure securing said connector to said unit, and a connector attached to said orientation change mechanism configured to hold securely any one of a plurality of different instrumentalities.

10. The combination of claim 9 and a gripping device, said gripping device comprising a vise grip pliers having jaws, and a rotatable bolt to change the location at which the jaws of such pliers are set relative to one another.

* * * * *